Patented July 21, 1953

2,646,405

UNITED STATES PATENT OFFICE 2,646,405

SURFACE ACTIVE COMPOUNDS

William B. Hughes, Bartlesville, Okla., assignor to Cities Service Oil Company, Bartlesville, Okla., a corporation of Delaware No Drawing. Application January 31, 1950, Serial No. 141,597

2 Claims. (Cl. 252—341)

This invention relates to surface active compounds, and more particularly to compounds effective to cause a rapid and complete separation of the oil and water phases of a water-in-oil emulsion.

One of the most troublesome problems met with in crude oil production relates to the breaking of water-in-oil emulsions formed in wells producing both oil and brine. These emulsions are generally of two types, the first type a mechanically cut emulsion, which is usually formed in the well by faulty pumping equipment, the other type being a gas-cut emulsion, the formation of which is aided by the emulsifying action of certain asphaltenes and other chemical emulsifiers present in the crude oil. The emulsion commonly encountered is a mixture of both of these types, and its properties will vary from well to well, and even from day to day in the same well. Unless these emulsions can be effectively and completely broken, the oil content is lost. It is also desirable that the emulsion be broken as rapidly as possible, in order to keep the number and size of the settling tanks to a minimum.

There are apparently two phases of an emulsion resolving problem. The first involves a surface phenomenon in which the oil film surrounding the water particles of micron size is weakened, allowing the particles to coalesce into larger droplets. This phase will hereinafter be referred to as the emulsion breaking step. The other phase involves the splitting of the broken emulsion into separate oil and water phases. This phase will be referred to as the water separation step.

It has been found in practice that commercially available chemical emulsion breakers, while exhibiting satisfactory emulsion breaking and water separation characteristics on most emulsions, are unsatisfactory on certain other emulsions, since rapid water separation is not obtained, necessitating holding the emulsion in settling tanks for long periods of time in order to effectively separate the water from the oil. Obviously, under such circumstances, it is necessary to provide a much greater number of settling tanks than would be needed if rapid water separation took place.

It is an object of this invention to provide a series of compounds which are effective to cause rapid water separation from broken emulsions.

I have found that the reaction product of one mol of a glyceride of a hydroxy acid having 12 or more carbon atoms with from about 2 to about 3 mols of triethanol amine, neutralized to a methyl orange end point with a hydroxy acid, has some emulsion-breaking qualities, but is not particularly efficient compared to a number of good commercial emulsion breakers. The product does, however, exhibit remarkable water separation qualities. When mixed with an efficient emulsion breaker in an amount of from about 90 to 99 parts of breaker to from about 10 to about 1 part of the product, a composition results which will efficiently break and separate even the most stubborn emulsion. Glycerides suitable for my purposes include castor oil and the glycerides of hydroxy acids produced in the controlled oxidation of paraffin wax, hereinafter referred to as hydroxy wax acids, or any other long chain hydroxy acid such as hydroxystearic acid. The most critical ingredient of the composition appears to be the acid used to neutralize the triethanol amine-glyceride product. This acid apparently must contain one or more hydroxyl groups, since the products obtained by neutralization of the glyceride-amine product with nonhydroxy acids such as acetic acid, propylated naphthalene sulfonic acid, or sulfonated castor oil show little or no water separation action. Thus as a neutralizing acid I may use hydroxy wax acids, or any other fairly long-chain hydroxy acid.

In order that those skilled in the art may more clearly understand the nature of my new compounds and their manner of preparation, the following example is given, merely by way of illustration, and it is to be understood that my invention is not limited to the specific materials or proportions set forth.

Example 925 grams of castor oil and 298 grams of triethanol amine were mixed and heated for a period of about two hours at about 180° C. to complete the reaction and to eliminate water formed. The product obtained was a yellow oily substance. This product was then neutralized to a methyl orange end point with hydroxy wax acids. The end product showed some emulsion-breaking characteristics when tested on several water-in-oil emulsions obtained from producing oil wells, but complete breaks were not obtained, about 5 per cent of the emulsion remaining unbroken.

When used in conjunction with an emulsion breaker capable of completely breaking the emulsion, the compounds described above aid markedly in effecting a rapid and complete water separation. Thus, an amount of from about one per cent to about 10 per cent was added to a number of the aldehyde-amine-propylated naphthalene sulfonic acid emulsion breakers disclosed in my copending application Serial No. 131,699, now abandoned, filed December 3, 1949 and which are prepared by spontaneously reacting two mols of a non-tertiary alkyl, alkanol, or heterocyclic amine with one mol of an aldehyde, separating water of reaction from the reaction product, and neutralizing the reaction product to a methyl orange end point with a propylated naphthalene sulfonic acid prepared according to the directions given in U. S. Patent No. 1,873,165. The aldehyde-amine mixture will react spontaneously with the evolution of heat, and the reaction will normally go to completion within a few hours at ambient temperatures, but it is desirable to heat the reaction mixture to speed the reaction and to insure that it goes to completion. When heated to about 100° C., the reaction is complete in about one half hour. Among the amines found useful in formulating these emulsion breakers are mono- and diethanol amine, mono- and diethyl amine, octyl amine, nonyl amine, hexadecyl amine, octadecyl amine, triethylenetetramine, diacetone amine, N-octyl acetone amine, morpholine, and mixtures thereof. Generally, best results may be obtained by using amines in the $C_8$–$C_{12}$ range. Aldehydes suitable for use in preparing the emulsion breakers may be alkyl, aryl, or heterocyclic, such as formaldehyde, acetaldehyde, furfural, benzaldehyde, heptaldehyde, ethyl hexaldehyde, and nonyl aldehyde.

The mixture was tested on emulsions which the breaker alone had broken completely, but was unsatisfactory in effecting complete water separation. In all instances the mixture was successful in effecting a complete break, with rapid and complete water separation. Similar action was noted when the new compounds were used in combination with commercial emulsion breakers operative to break certain emulsions, but which, when used alone, exhibited poor water separation characteristics.

Having now described my invention, what is claimed as new and useful is:

1. The process of resolving emulsions including subjecting a petroleum water-in-oil emulsion to the action of a composition consisting essentially of from about 90 to about 99 per cent of a chemical effective to break a petroleum water-in-oil emulsion and from about 1 per cent to about 10 per cent of the reaction product obtained by reacting one mol of a glyceride of a hydroxy acid having more than 11 carbon atoms with from about 2 to about 3 mols of triethanol amine at a temperature of about 180° C., and neutralizing the resulting product to a methyl orange end point with a hydroxy acid having more than 11 carbon atoms.

2. The process of resolving emulsions including subjecting a petroleum water-in-oil emulsion to the action of a composition consisting essentially of from about 90 to about 99 per cent of a chemical effective to break a petroleum water-in-oil emulsion and from about 1 per cent to about 10 per cent of a product obtained by reacting one mol of castor oil with from about 2 to about 3 mols of triethanol amine at a temperature of about 180° C., and neutralizing the resulting product to a methyl orange end point with hydroxy wax acids.

WILLIAM B. HUGHES.

References Cited in the file of this patent

UNITED STATES PATENTS

| Number | Name | Date |
|---|---|---|
| 2,167,347 | De Groote et al. | July 25, 1939 |
| 2,167,349 | De Groote et al. | July 25, 1939 |
| 2,259,704 | Monson et al. | Oct. 21, 1941 |
| 2,440,349 | Schaeffer | Apr. 27, 1948 |
| 2,448,626 | Schaeffer | Sept. 7, 1948 |
| 2,491,478 | Cook et al. | Dec. 20, 1949 |